United States Patent [19]

Jackson

[11] Patent Number: 4,502,704
[45] Date of Patent: Mar. 5, 1985

[54] WORKHOLDING DEVICES

[75] Inventor: Joseph F. Jackson, Halifax, England

[73] Assignee: Pratt Burnerd International Limited, Halifax, England

[21] Appl. No.: 435,256

[22] Filed: Oct. 19, 1982

[30] Foreign Application Priority Data

Oct. 29, 1981 [GB] United Kingdom ............... 8132691

[51] Int. Cl.$^3$ ............................................. B23B 31/28
[52] U.S. Cl. ................................. 279/111; 279/1 R; 279/1 C
[58] Field of Search ............. 279/110, 111, 123, 1 SJ, 279/1 H, 1 ME, 1 R, 1 C

[56] References Cited

U.S. PATENT DOCUMENTS 4,254,676 3/1981 Wilson ........................... 279/110 X Primary Examiner—Z. R. Bilinsky
Attorney, Agent, or Firm—LeBlanc, Nolan, Shur & Nies

[57] ABSTRACT

A workholding device comprises a body 10, a plurality of relatively movable base jaws 12, each base jaw 12 carrying one of a plurality of top jaws 13, such that when the base jaws 12 are moved relative to one another, a workpiece 15 can be gripped by the top jaws 13, and a sensing device 14 positioned to sense force transmitted from a top jaw 13 to a base jaw 12. Preferably a second sensing device 16 is provided to sense centrifugal force to permit compensation for its effect on the top jaws, so that a signal can be obtained which is an accurate measure of the force prevailing between the top jaws 13 and the workpiece 15.

8 Claims, 2 Drawing Figures

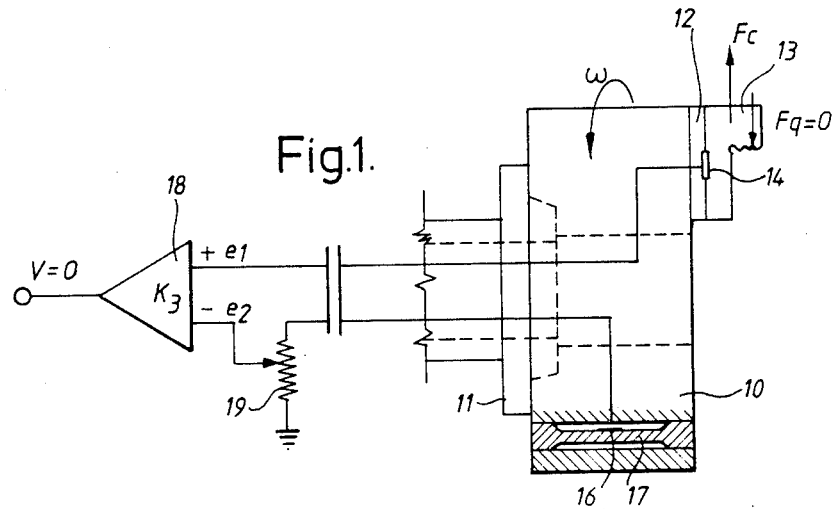
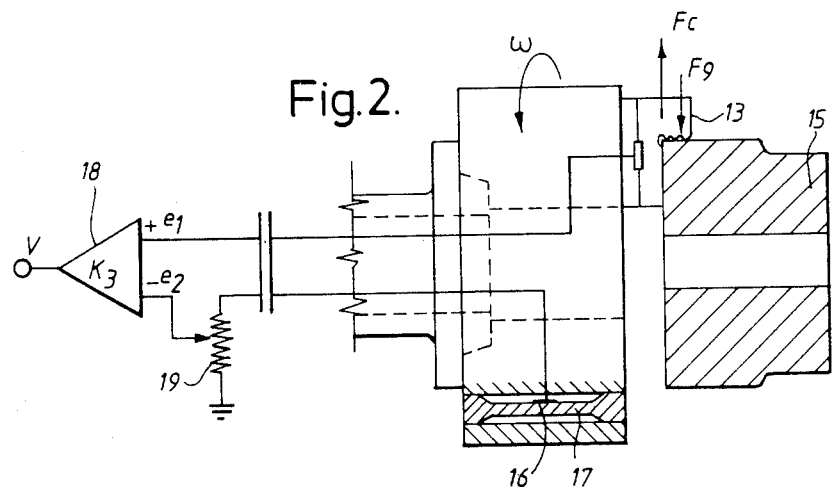

WORKHOLDING DEVICES

BACKGROUND TO THE INVENTION

This invention relates to workholding devices.

DESCRIPTION OF THE PRIOR ART

Our United Kingdom Pat. No. 2,010,140 describes and claims a workholding device comprising a chuck for gripping a workpiece, the chuck having at least one gripping face which, when the chuck is in use, engages the workpiece, the chuck being provided with detection means for determining the value of a desired force between the said gripping face of the workpiece, the detection means comprising a sensing device positioned in the region of the gripping face to sense directly forces applied to the gripping face by the workpiece.

Such a device has now proved to have disadvantages in certain practical applications. In some of the embodiments of the invention described in United Kingdom Pat. No. 2,010,140 electrical connections are required to transfer a signal from a transducer to a chuck body through a jaw carrying the transducer. These electrical connections can prove susceptible to contamination by debris and cutting fluid from the machining process.

The problem is aggravated by the fact that it is necessary to change jaws when changing the range of workpiece gripping radii. For example fourteen different transducer bearing jaws may be required with certain chucks. Not only is it inconvenient to have to provide a large number of jaws with a set of electrical connections, and fit each transducer bearing jaw with its transducer or swap an interchangeable transducer from jaw to jaw, but the likelihood of a fault or contamination developing when jaws are being frequently interchanged is substantially increased.

A further disadvantage is that it is not possible to use the known chucking technique of fitting a set of soft jaws and then machining them when in position to obtain accurate location of a workpiece. Clearly a jaw fitted with a transducer on or adjacent its gripping face cannot be machined without destroying or damaging the transducer.

SUMMARY OF THE INVENTION

According to this invention a workholding device comprises a body, a plurality of relatively movable base jaws, each base jaw carrying one of a plurality of interchangeable top jaws, such that when the base jaws are moved relative to one another, a workpiece can be gripped by the top jaws, and a sensing device positioned to sense force transmitted from a top jaw to a base jaw.

This invention enables a transducer to be positioned on or in a base jaw which is normally permanently connected to the chuck body, so that the interchangeable top jaws do not themselves need to carry a transducer.

This invention provides information which is substantially as useful and as versatile as the information provided by the invention described in United Kingdom Pat. No. 2,010,140 except that the effect of centrifugal force on the top jaws is not taken into account.

Accordingly, it is a preferred feature of this invention that a second sensing device is provided to sense centrifugal force to permit compensation for its effect on the top jaws.

The second sensing device may be mounted on a member which is, when the workholding device is in use, subject to centrifugal force, for example a member mounted on the body of the workholding device.

The member may comprise a beam which is subjected to deflection under the action of centrifugal force.

Preferably means are provided to compare the signals received from the two sensing devices and provide a mean signal related to an actual force between a top jaw and a workpiece.

For example electric signals from the two sensing devices may be fed to an operational amplifier.

Means may be provided to calibrate the device each time a set of top jaws is changed. For example the workholding device may be rotated with no workpiece present, and there may be means to vary the effect of the mean signal from the sensing devices until the output of the operational amplifier is at a datum level, for example zero.

Other preferred features and advantages of the invention will become apparent from the following description of an embodiment of the invention.

BRIEF DESCRIPTION OF THE DRAWINGS

FIG. 1 is a diagrammatic side view of an embodiment of workholding device according to the invention, during a calibration stage; and FIG. 2 is a view similar to FIG. 1 but showing the workholding device in operation.

DESCRIPTION OF AN EMBODIMENT OF THE INVENTION

FIG. 1 illustrates a chuck body 10 which is mounted on a machine tool spindle 11. The chuck has three jaws but for the sake of simplicity only one is illustrated. The jaw is in two parts, comprising a base jaw 12 and a top jaw 13. The base jaw 12 is normally permanently attached to the body 10 and is movable radially outwardly and inwardly as desired by a conventional chuck operating mechanism.

The top jaw 13 is releasably secured to the base jaw for movement with the base jaw. Thus the top jaw forms the actual gripping operation, but its movements are controlled by the base jaw 12 to which it is attached.

The radial position of the top jaw 13 relative to the base jaw 12 can be changed, for example to vary the range of its operating radii, and the top jaw 13 can be replaced by other top jaws having different shapes and dimensions, depending upon the job which the chuck is to carry out.

According to this invention the top jaw 13 does not carry any sensing device, but a strain gauge transducer 14 is mounted on the base jaw 12, at the interface with the top jaw 13. The effect of this is that the transducer produces an electrical signal which is related to force transmitted from the top jaw to the base jaw.

This force is not directly related to the force with which the top jaw grips a workpiece, because of the effect of centrifugal force on the top jaws.

In FIG. 2 a workpiece 15 is shown in position being gripped with a force Fq. There is therefore an equal and opposite reaction force on the top jaw equal to Fq. In addition, in FIG. 2, the top jaw 13 is shown as being subject to a centrifugal force Fc.

To enable compensation to be made for the effect of Fc, a second strain gauge transducer 16 is provided within the chuck body, mounted on a beam 17 simply supported at its ends. When the chuck is rotating centrifugal force will cause the beam 17 to flex, and this will cause the second strain gauge transducer 16 to produce a signal.

This embodiment of the device includes an operational amplifier 18. The signal from the transducer 14, e1, is taken directly to a first input of the operational amplifier 18. The signal from the second transducer 16, is taken to a second input of the operational amplifier 18 via a calibration device such as a potentiometer 19. The operational amplifier 18 produces a signal V which is proportional to the difference between the two inputs.

It will be seen that transducer 14 measures the total force transferred from the top jaw to the base jaw, which is equal to Fc+Fq. If w is the rotational speed, m is the top jaw mass and r is the radius of the centre of gravity of the top jaw from the axis of rotation, then:

$$Fc = w^2 mr \quad \text{(Equation 1)}$$

The electrical signal e1 from the transducer 14 is proportional to the total force acting on it such that: $e1 = K1\ (Fc+Fq)$ where K1 is a constant. Substituting for Fc from equation (1):

$$e1 = K1\ (w^2 mr + Fq) \quad \text{(Equation 2)}$$

The signal e2 reaching the second input of the amplifier 18 is proportional to the centrifugal loading such that:

$$e2 = aK2Bw^2 \quad \text{(Equation 3)}$$

K2 and B are constants and a is an adjustable attenuation constant which may be used for calibrating the system.

The output voltage V from the amplifier 18 is proportional to the difference of the signals e1 and e2 and is given by $V = K3\ (e1 - e2)$ where K3 is the amplifier gain constant.

Substituting for e1 and e2 from equations (2) and (3):

$$V = K3[K1(w^2 mr + Fq) - aK2Bw^2] \quad \text{(Equation 4)}$$

To calibrate the system the chuck is rotated at speed without a workpiece as shown in FIG. 1 and the potentiometer is adjusted to give a particular value of a, referred to hereinafter as a (null), such that the amplifier output voltage is zero. Under these conditions Fq and V equal 0 and substituting into Equation (4)

$$K1w^2 mr - a(\text{null})K2Bw^2 = 0$$

from which $$a(\text{null}) = (K1mr)/(K2B) \quad \text{(Equation 5)}$$

It will be seen that it is only necessary to obtain the value of a (null) at one speed. The value is not dependant upon w, see Equation 5, and is therefore applicable to all speeds.

Once the system has been calibrated or nulled in this way, this value of a may be substituted into equation (4) to obtain the system operation equation. Hence $$V = K3[K1(w^2 mr + Fq) - (K1mr)/(K2B)K2Bw^2]$$

From which $$V = K3K1Fq \quad \text{(Equation 6)}$$

Thus the output voltage of the amplifier is proportional to the true gripping force Fq holding the workpiece and takes into account the centrifugal loss of gripping force due to the top jaw mass, at all rotational speeds.

After the system has been nulled and with the chuck rotating at speed without a workpiece a simple method may be employed to check or determine the system calibration constant. By changing the polarity of the signal e2 at the amplifier to positive, the output voltage V now becomes proportional to the sum of e1 and e2 and equation (4) becomes:

$$V = K3[K1(w^2 mr + Fq) + aK2Bw^2]$$

Substituting a (null) from equation (5)

$$V = K3[K1(w^2 mr + Fq) + K1w^2 mr]$$

For the calibration condition, without a workpiece, Fq=0 and $$V = 2K3K1w^2 mr \quad \text{(Equation 7)}$$

From equation (7) it may now be seen that if a top jaw of a known mass and radius is rotated at a known speed and the output voltage of the amplifier is measured, then the calibration constant K3 K2 may be determined and employed in equation (6) to relate the output voltage to the workpiece gripping force.

It is generally considered that a chuck should not be used at a rotational speed which is greater than that at which the gripping force drops to a level of half the stationary chuck gripping force. Thus the calibration method permits the system to be calibrated in the region of its maximum full scale output.

The invention is not restricted to the details of the foregoing embodiment, for example the transducer need not be positioned at the jaw interface as shown. It may be positioned anywhere on or in the base jaw where it is affected by force transmitted from the top jaw.

It is not essential that the chuck be a three jaw chuck. It may have two, four, or any other desired number of jaws. A transducer may be mounted on each jaw, only on one jaw, or only on some of the jaws.

I claim:

1. A workholding device comprising a body, a plurality of relatively movable base jaws, a plurality of interchangeable top jaws, each top jaw being carried by an associated one of the base jaws, means for moving the base jaws relative to one another to grip a workpiece with the top jaws, a first sensing device positioned to sense force transmitted from a top jaw to a base jaw, and a second sensing device being provided to sense centrifugal force to permit compensation for its effect on the top jaws.

2. A workholding device as claimed in claim 1, in which the second sensing device is mounted on a member which is, when the workholding device is in use, subject to centrifugal force.

3. A workholding device as claimed in claim 2, in which the second sensing device is mounted on a member mounted on the body of the workholding device.

4. A workholding device as claimed in claim 2, in which the member comprises a beam which is subjected to deflection under the action of centrifugal force.

5. A workholding device as claimed in claim 1, in which means are provided to compare the signals received from the two sensing devices and provide a mean signal related to an actual force between a top jaw and the workpiece.

6. A workholding device as claimed in claim 5, in which electric signals from the two sensing devices are fed to an operational amplifier.

7. A workholding device as claimed in claim 6, in which means are provided to calibrate the device each time a set of top jaws is changed.

8. A workholding device as claimed in claim 7, in which the means to calibrate the device each time a set of top jaws is changed comprise means to vary the effect of the mean signal from the sensing devices, when the workholding device is rotated with no workpiece present, until the output of the operational amplifier is at a datum level, for example zero.

* * * * *